Jan. 17, 1956     R. ROUSSEAU     2,731,585
LUMINOUS DISPLAY APPARATUS
Filed April 21, 1952     3 Sheets-Sheet 1
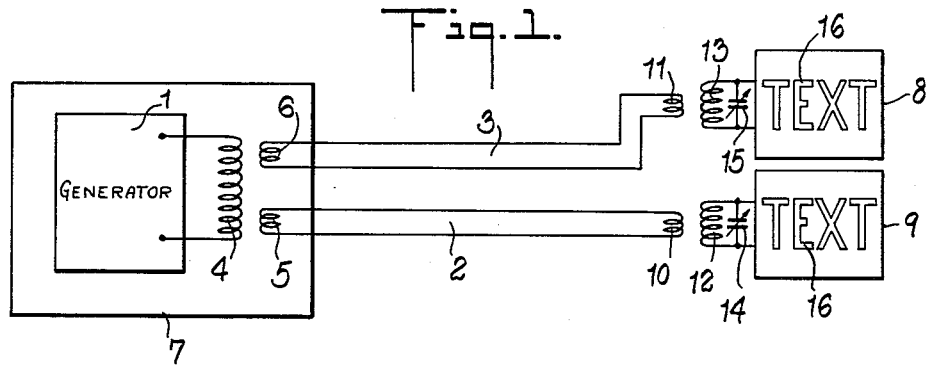
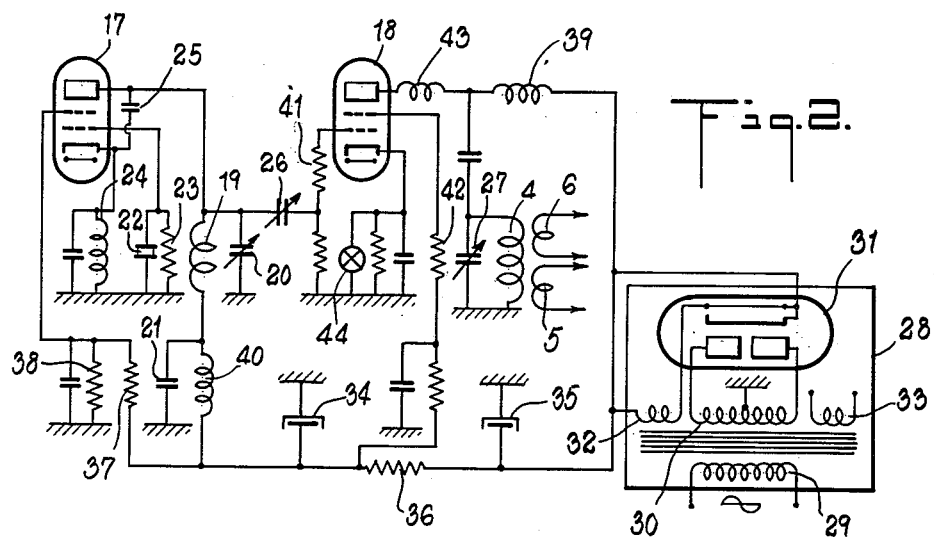
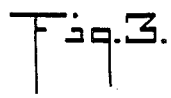
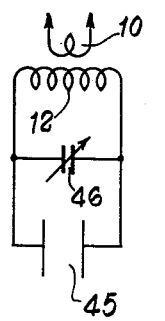
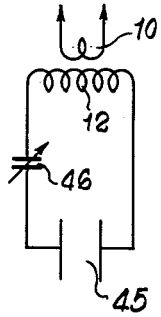
INVENTOR.
ROBERT ROUSSEAU
BY
*Kenyon & Kenyon*
ATTORNEYS Jan. 17, 1956 R. ROUSSEAU 2,731,585
LUMINOUS DISPLAY APPARATUS
Filed April 21, 1952 3 Sheets-Sheet 2
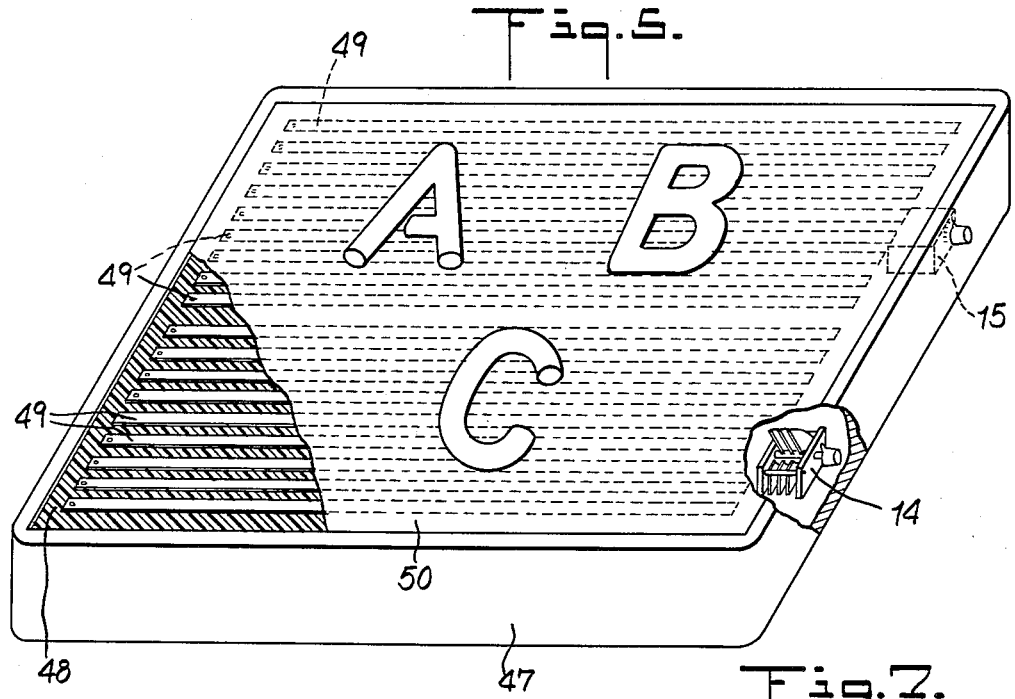
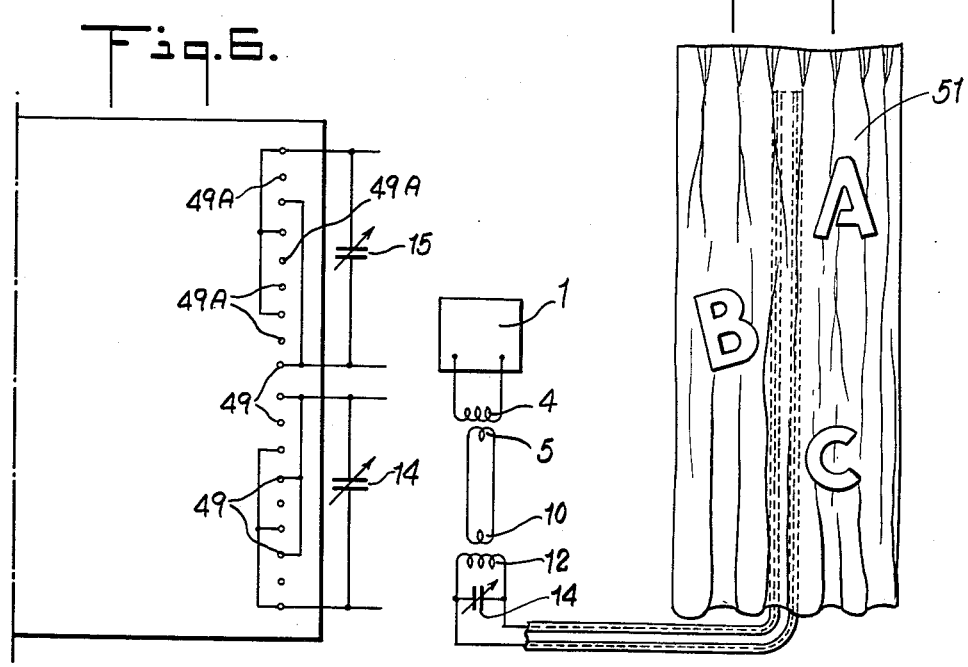
INVENTOR.
ROBERT ROUSSEAU
BY
Kenyon & Kenyon
ATTORNEYS Jan. 17, 1956 R. ROUSSEAU 2,731,585
LUMINOUS DISPLAY APPARATUS
Filed April 21, 1952 3 Sheets-Sheet 3
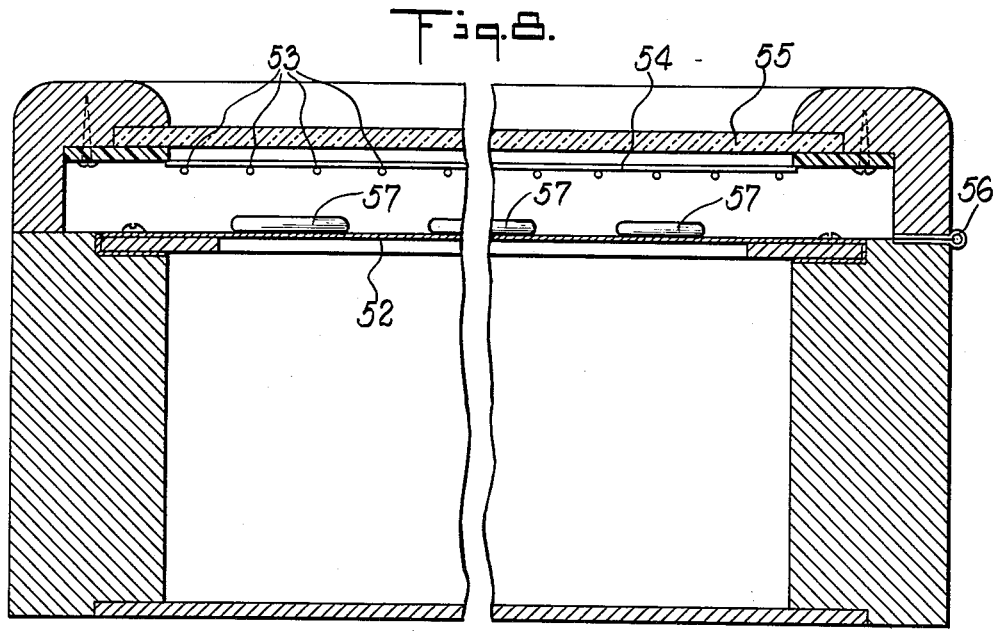
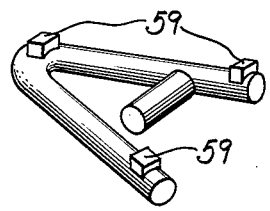
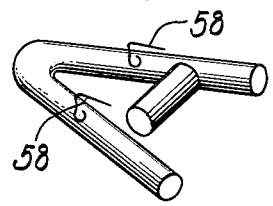
INVENTOR.
ROBERT ROUSSEAU
BY
Kenyon & Kenyon
ATTORNEYS

United States Patent Office 2,731,585
Patented Jan. 17, 1956

2,731,585

LUMINOUS DISPLAY APPARATUS

Robert Rousseau, Evry-Petit-Bourg, France, assignor to Andres Soriano, New York, N. Y., and Ansor Corporation, New York, N. Y., a corporation of Delaware Application April 21, 1952, Serial No. 283,286

Claims priority, application France June 15, 1951

4 Claims. (Cl. 315—248)

This invention relates to luminous display apparatus particularly useful for advertising purposes and of the type in which gaseous discharge tubes, shaped as letters, for example, are excited by high frequency electric fields. Usually such apparatus will include a high frequency generator or oscillator for generating the high frequency electric field and some sort of a display device such as a display board adapted to display the gaseous discharge tubes when illuminated by energization within the electric field and including suitable electrodes which establish that field by virtue of their connection to the generator.

It is the general object of the invention to provide such apparatus improved in one or more of the following respects: elimination of radiation which might tend to interfere with radio and television reception in the vicinity; minimization of energy waste by high efficiency operation of the generator; improved transmission means between the generator and the display device; and versatility of operation, i. e., ease and convenience with which the user may re-arrange the desired display or advertising configurations while at the same time maintaining optimum operating conditions of efficiency and maximum luminescence.

The full nature of the invention, as well as further objects thereof, will better be understood by reference to the following description of illustrative embodiments thereof which are depicted in the annexed drawings. In view of the similarity of elements throughout the drawings like reference numerals are used to indicate like elements throughout the various figures which may be briefly described as follows:

Fig. 1 is a generalized schematic indication of the apparatus as a whole showing a generator at the left connected through suitable transmission lines to display devices on the right;

Fig. 2 shows a working circuit for a suitable generator;

Figs. 3 and 4 are circuit illustrations of ways for tuning the display devices for purposes indicated in greater detail hereinafter;

Fig. 5 is a perspective view of a suitable display device as an advertising board or like devices displaying illuminated gaseous discharge devices;

Fig. 6 is a schematic illustration of the electrode arrangement in Fig. 5;

Fig. 7 is an alternative apparatus in which the display device takes the form of a curtain, a drape or like device having concealed electrodes therein and illuminated discharge devices hung thereon;

Fig. 8 is an alternative display device somewhat like that of Fig. 5;

Figs. 9 and 10 illustrate suitable alternative ways of affixing the gaseous discharge tubes to the display device where affixation is necessary.

Referring now to the Fig. 1, a suitable generator 1 of constant high frequency power energizes one or more transmission lines 2 and 3 through a step-down transformer having primary winding 4 and secondary windings 5 and 6. For example, this generator may have a constant frequency of 6,780 kilocycles or a harmonic thereof, this frequency being a frequency which does not interfere with presently allocated radio and television frequencies. The generator and the step-down transformer are shielded by a suitable metallic grounded shield 7 in order to minimize radiation and stray fields which might otherwise be sent out by the generator and its associated circuit. Further, since the transformer is a step-down transformer, the electric energy issuing from the shield is at low voltage, thus reducing the electric field around the transmission line and leakage of energy. The transmission lines 2 and 3 are of low impedance and comprise each two wires. The lines are illustrated as a plurality to indicate the ease with which one or more display devices 8 and 9 may be operated from the same generator as will be indicated in greater detail hereinafter. These display devices 8 and 9 include suitable electrodes, illustrated hereinafter, in the vicinity of suitable gaseous discharge tubes in the form of display letters illustrated, for example, as spelling out the word TEXT. These electrodes are energized by the transmission lines through step-up transformers, including primary windings 10 and 11 connected to the transmission lines and secondary windings 12 and 13 connected to the electrodes.

Across the terminals of the secondary windings are the variable condensers 14 and 15 having the purpose of providing means whereby the circuits of the display devices may each be tuned to the frequency of the generator 1. This tuning feature is desirable so that the operator may produce the maximum voltage in the vicinity of the discharge tubes 16 by producing resonance in the circuit and also so that he may use different numbers of letters. If different numbers of letters are used, the capacity in the circuit is apt to be different and, therefore, capacity adjustment, increase or decrease, may be necessary to maintain tuned or resonant condition as the numbers of letters are changed. For example, it will be possible to use a smaller number of letters in the device 9 than in the device 8 and yet maintain both of them tuned to the constant generator frequency by giving ther respective condensers 14 and 15 different values.

A suitable form of the low impedance transmission lines 2 and 3 may comprise parallel wires having a known characteristic impedance. In a suitable form now on the market the wires are embedded in a tape-like or ribbon insulation which places them apart a distance of something like one-half inch. The terminating primary coils 10 and 11 should have an impedance equal to the characteristic impedance of the lines 2 and 3 in order to prevent the formation of standing waves in the line. In this manner, radiation of energy from the lines will be minimized.

Fig. 2 shows the details of a suitable generator 1. It will be noted that the step-down transformer with its coils 4, 5 and 6 is in the output of Fig. 2. This generator includes an oscillator stage centering around the tetrode tube 17 and a power stage centering around the tetrode tube 18. The anode of the tube 17 is connected to an oscillatory circuit comprising the coil 19, variable condenser 20 and a fixed condenser 21. The coil 19 is coupled to a quartz oscillator 22 which is shunted by a resistor 23 and which is connected to the control grid of the tube 17. The quartz oscillator maintains the frequency constant in the well-known manner. The feed back which enables the network to oscillate is accomplished by the coil 24 in the cathode circuit and by the capacitative coupling between the anode and the cathode indicated by the capacitance 25.

The oscillating voltage of the coil 19 is applied to the control grid of the tube 18 through the variable condenser 26. The amplified oscillations appear in the tuned oscillatory circuit formed by the coil 4 and the variable condenser 27.

The generator just described is energized by means of the convenient rectifier 28 which includes a transformer having a primary winding 29 connected to any source of alternating current power, and a secondary winding 30 which energizes the full wave rectifier tube 31, the filament of the latter being heated by current supplied by the tertiary winding 32. Still another output winding 33 of the transformer may be used to supply heating current for the filaments of the tubes 17 and 18. High voltage is applied to the anodes and control grids of the tubes 17 and 18 in the well-known manner.

The condensers 34 and 35 and a resistor 36 are provided for filtering the high voltage current in order to prevent low frequency modulation of the generator. Moreover, the resistor 36 lowers the voltage of the screen grid of the tube 18. The voltage dividers comprising the resistors 37 and 38 apply potential to the screen grid of the tube 17.

The circuit also includes the choke coils 39 and 40 for separating the power supply circuits from the oscillating circuits and the resistors 41 and 42 and coil 43 for preventing the formation of ultra-high frequency oscillations in the circuit of the tube 18. A glow lamp 44 shunted across the cathode bias circuit for the tube 18 serves when lighted to indicate that the generator is in operation.

The tuned frequency of the circuits comprising the coil 19 and condensers 20 and 21 in the one case and the coil 4 and condenser 27 in the other will be that of the quartz oscillator 22 or preferably one of its harmonics, such as the second harmonic. Thus, with a quartz crystal having a fundamental frequency of 6780 kilocycles, the generator may have a frequency of 13,560 kilocycles, which, because of the crystal is constant. This frequency only is transmitted through the transmission lines 2 and 3 and the high voltage filtering prohibits a modulation of the frequency so that there is no interference with radio or television receiving sets located in the vicinity since these frequencies are frequencies not allocated to radio and television purposes.

Because of the arrangements previously indicated in connection with Fig. 1, i. e., step-down and step-up transformers interconnected by a low impedance line, it becomes impossible for the circuits of the display devices 8 and 9 to affect the frequency in the tuned circuit comprising the coil 4 and the condenser 27; the latter, therefore, remains constant. As indicated, one or more secondary coils 5 and 6 may be coupled to this tuned circuit without affecting its constant frequency relationship.

It will be understood that the step-up transformers, or more precisely their secondary windings 12 and 13, will be applying their output voltage across electrodes in the display devices 8 and 9, which electrodes, in effect, comprise a condenser. The latter inter-electrode capacity may be illustrated as condenser 45 in Figs. 3 and 4 and it is between the plates in this condenser that the electric discharge tubes are positioned. The inductance of secondary winding 12 and the capacitance of the condenser 45 will be such that ordinarily the circuit which they form is tuned to the constant frequency of the generator 1. It will be understood, however, that the capacitance of the condenser 45 will vary somewhat depending upon the number of gaseous discharge tubes between the electrodes. In order to permit the circuits to be tuned or re-tuned to the constant frequency when the number of tubes and consequently the capacitance of the condenser 45 is changed, trimming condenser 46 may be provided as indicated by Fig. 3 in which it is shown as being in parallel with the coil 12 and the condenser 45. It may, of course, be in series as shown by Fig. 4. In either case, if capacitance is added to the circuit by the introduction of additional discharge tubes, it may be reduced by use of the condenser 46, and vice versa. Further, the condenser 46 may be used by the operator to insure that the voltage in the circuit is at the tuned frequency and thus at a maximum, producing the maximum luminescence in the discharge tubes. It is understood that what has been said about the circuits shown in Figs. 3 and 4 applies equally to the circuit of the upper display device 8 in Fig. 1. The parallel arrangement of condenser 46 (Fig. 3) will be resorted to when condenser 45 has a low capacity (a small display device), whereas the series arrangement (Fig. 4) will be resorted to when condenser 45 has a high capacity (a large display device).

As previously indicated, the adjustment of condenser 46 has no effect on the output of the oscillatory circuits of the generator. In other words, adjustment by condenser 46 alters only the amount of high frequency voltage and energy supplied by the generator and in no way affects the impedance and frequency characteristics thereof. This would not be the case if primary winding 4 were directly coupled to the secondary windings 12 or 13 without the interposition of the transmission lines 2 and 3 and the coils terminating them. In this manner, the display device and the generator are electromagnetically independent of each other.

Fig. 5 shows a display device particularly suited to the foregoing and actually includes both the display devices labeled 8 and 9 in Fig. 1. It takes the form of a suitable frame 47, the upper open face of which is covered by an insulating plastic plate 48 having embedded therein a plurality of parallel conductors 49 which are to form the electrodes connected to the secondary windings 12 and 13. The upper nine conductors 49 are associated with the variable condenser 15 and the lower nine with the variable condenser 14 mounted on the frame and provided with the indicated adjustment knobs. These condensers are of the well-known interleaving type commonly used for tuning radios.

As Fig. 6 will indicate, alternate conductors 49 in the upper and lower groups may be interconnected so that alternate arrays are formed, each array of alternating conductors comprising one of the electrodes in the display device. Of course, the upper and lower circuits are independent as Fig. 1 indicates. When either one or the other of these circuits are energized by the transmission lines 2 and 3 of Fig. 1, a high frequency field will exist over the top surface of plate 48 and this may be used to energize gaseous discharge tubes such as those indicated in the form of the letters A, B and C lying on the surface of the display device. Preferably, the plate 48 is covered with a black cloth or other suitable covering 50 to conceal the conductors 49; such a covering is shown broken away to expose the conductors for illustration. It will be noted that the upper half group of conductors 49 energizes two letters A and B and its condenser 15 will be adjusted accordingly to maintain resonance in the circuit; similarly condenser 14 on the lower circuit will be adjusted to have more capacity than condenser 15 because of the lesser number of letters. It may be desirable to have selected members of the conductors 49 electrically unconnected to the circuit except by their capacitative relation, i. e., they are left "floating" with no direct wire connections. The conductors 49a in Fig. 6 will illustrate.

In Fig. 7 is shown a useful arrangement of the apparatus. Here, the energizing circuit of the generator 1, coils 4, 5, 10, 12 and condenser 14 may be the same as in Fig. 1. However, the display device itself may in this case take the form of a curtain or drape 51 hanging in a room or display location and the electrodes may take the form of a tape-like transmission line pinned to the drape on the concealed side as indicated by the dotted lines. Suitable transmission line wire for this purpose is readily available on the market in the form of the type of wire commonly used for television lead-in wire; it includes two parallel wires about one-half inch apart and embedded in flexible insulation which maintains the wires in that separation. When such a transmission line is pinned on the concealed side of the drape 51, it may energize gaseous discharge tubes in the form of the letters A, B and C pinned to the drape (cf. Fig. 9).

The alternative embodiment of the display device shown in Fig. 10 may comprise as the electrodes a back board including a metallic plate 52 mounted on a rectangular frame similarly to the plate 48 in Fig. 5. Above this and mounted in a similar rectangular frame is an array of parallel wires 53 affixed to or embedded in a transparent plastic plate 54, over the top of which may be imposed the glass plate 55. The array of wires 53 comprise one electrode and the metallic plate 52 comprises the other and they are connected respectively to the secondary terminals of a coil such as coil 12 in Fig. 1. Plate 52 may be of magnetic material for co-operation with the magnetic clamps on discharge tube of the type to be indicated in connection with Fig. 10. Hinge means 56 may be provided so that the framework supporting the electrode array 53 may be rotated upwardly away from the plate 52 for the insertion of gaseous discharge tubes 57 in the form of letters between the electrodes.

Figs. 9 and 10 illustrate suitable gaseous discharge tubes for the purposes of the invention. They may, for example, comprise tubes of glass shaped as letters and having sealed therein an atmosphere of rare gas and a drop of mercury which can be excited by the high frequency fields of the apparatus. In the case of Fig. 9, hooks 58 are affixed to the letters to permit them to be hung from the drape 51 in Fig. 7 or from thte cloth covering 50 in Fig. 5 if, for example the display device in that figure is positioned vertically. In the case of Fig. 10, permanent magnets 59 are affixed so that the letters can be caused to adhere to the magnetic plate 52 of Fig. 8 if that plate should be positioned vertically.

In one practical form of the invention, the following specific values were given to the indicated components:

| | |
|---|---|
| Coil 4 | 11 turns. |
| Coil 5 | 2 turns. |
| Coil 10 | 2 turns. |
| Coil 12 | 2½ to 6 turns depending on the capacitance of the display device 9. |
| Characteristic impedance of line 2. | 150 ohms. |
| Power absorbed by the high frequency generator 1. | 50 to 175 watts, depending on the size of the display device and the number of tubes. |
| Power supplied to device 9. | 10 to 75 watts, i. e., an efficiency of 20 to 43%. |

In place of the gaseous discharge tubes it is possible to use solid tubes of the substance known at present as "conductive glass" which luminesces on passage of an electric current.

I claim:

1. In a luminous display apparatus in which a plurality of independent gaseous discharge tubes may be positioned for inductive excitation by high frequency fields and in varied numbers, the combination of a high frequency generator fixedly tuned to generate constant frequency, a step down transformer having a primary winding and a secondary winding and having its primary winding electrically connected to the output of said generator, a shield surrounding said generator and step down transformer, a step up transformer having a primary winding and a secondary winding having terminals, a two-wire transmission line electrically connected to the secondary winding of said step-down transformer and to the primary winding of said step-up transformer, said transmission line having an impedance substantially equal to the characteristic impedance of the primary winding of said step-up transformer, a display device for energizing a variable number of gaseous discharge tubes, comprising two spaced apart insulated electrodes respectively connected to the terminals of the secondary winding of said step-up transformer, means for supporting a plurality of said discharge tubes in inducting relationship to said electrodes in the vicinity of and in the field of said electrodes and tuning means in the circuit constituted by the secondary winding of the step-up transformer, the electrodes and tubes supported in the vicinity of and in the field of said electrodes comprising a variable condenser electrically connected to said electrodes and said secondary winding of said step-up transformer, whereby said circuit constituted by said secondary winding of said step-up transformer and said electrodes and tubes supported in the vicinity of and in the field of said electrodes may be tuned to the frequency of said generator when the number of tubes is varied, without varying the frequency of said generator.

2. In a luminous display apparatus in which a plurality of independent gaseous discharge tubes may be positioned for inductive excitation by high frequency fields and in varied numbers, the combination of a high frequency generator fixedly tuned to generate constant frequency, a step down transformer having a primary winding and a secondary winding and having its primary winding electrically connected to the output of said generator, a step-up transformer having a primary winding and a secondary winding having terminals, a two-wire transmission line electrically connected to the secondary winding of said step-down transformer and to the primary winding of said step-up transformer, said transmission line having an impedance substantially equal to the characteristic impedance of the primary winding of said step-up transformer, a display device for energizing a variable number of gaseous discharge tubes, comprising two spaced apart insulated electrodes respectively connected to the terminals of the secondary winding of said step-up transformer, means for supporting a plurality of said discharge tubes in inductive relationship to said electrodes in the vicinity of and in the field of said electrodes and tuning means in the circuit constituted by the secondary winding of the step-up transformer, the electrodes and tubes supported in the vicinity of and in the field of said electrodes comprising a variable condenser electrically connected to said electrodes and said secondary winding of said step-up transformer, whereby said circuit constituted by said secondary winding of said step-up transformer and said electrodes and tubes supported in the vicinity of and in the field of said electrodes may be tuned to the frequency of said generator when the number of tubes is varied, without varying the frequency of said generator.

3. In a luminous display apparatus in which a plurality of independent gaseous discharge tubes may be positioned for inductive excitation by high frequency fields and in varied numbers, the combination of a high frequency generator fixedly tuned to generate constant frequency, a step-down transformer having a primary winding and a secondary winding and having its primary winding electrically connected to the output of said generator, a step-up transformer having a primary winding and a secondary winding having terminals, a two-wire transmission line electrically connected to the secondary winding of said step-down transformer and to the primary winding of said step-up transformer, a display device for energizing a variable number of gaseous discharge tubes, comprising two spaced apart insulated electrodes respectively connected to the terminals of the secondary winding of said step-up transformer, means for supporting a plurality of said discharge tubes in inductive relationship to said electrodes in the vicinity of and in the field of said electrodes and tuning means in the circuit constituted by the secondary winding of the step-up transformer, the electrodes and tubes supported in the vicinity of and in the field of said electrodes comprising a variable condenser electrically connected to said electrodes and said secondary winding of said step-up transformer, whereby said circuit constituted by said secondary winding of said step-up transformer and said electrodes and tubes supported in the vicinity of and in the field of said electrodes may be tuned to the frequency of said generator when the number of tubes is varied, without varying the frequency of said generator.

4. In a luminous display apparatus in which a plurality of independent gaseous discharge tubes may be positioned for inductive excitation by high frequency fields and in varied numbers, the combination of a high frequency generator fixedly tuned to generate constant frequency, a step-down transformer having a primary winding and a secondary winding and having its primary winding electrically connected to the output of said generator, a step-up transformer having a primary winding and a secondary winding having terminals, a two-wire transmission line electrically connected to the secondary winding of said step-down transformer and to the primary winding of said step-up transformer, a display device for energizing a variable number of gaseous discharge tubes, comprising two spaced apart insulated electrodes respectively connected to the terminals of the secondary winding of said step-up transformer, means for supporting a plurality of said discharge tubes in inductive relationship to said electrodes in the vicinity of and in the field of said electrodes and tuning means in the circuit constituted by the secondary winding of the step-up transformer, the electrodes and tubes supported in the vicinity of and in the field of said electrodes electrically connected to said electrodes and said secondary winding of said step-up transformer, whereby said circuit constituted by said secondary winding of said step-up transformer and said electrodes and tubes supported in the vicinity of and in the field of said electrodes may be tuned to the frequency of said generator when the number of tubes is varied, without varying the frequency of said generator.

References Cited in the file of this patent

UNITED STATES PATENTS

| | | |
|---|---|---|
| 2,121,829 | Seaman | June 28, 1938 |
| 2,181,889 | Hanson | Dec. 5, 1939 |
| 2,184,530 | Penney | Dec. 26, 1939 |
| 2,185,674 | Michel | Jan. 2, 1940 |
| 2,291,467 | Goldberg | July 28, 1942 |
| 2,322,008 | Fodor | June 15, 1943 |

OTHER REFERENCES

Radio Amateur's Handbook, 22nd edition, pages 201–211. Published by American Radio Relay League, West Hartford, Conn.